(12) United States Patent
Ferman

(10) Patent No.: US 10,308,067 B2
(45) Date of Patent: Jun. 4, 2019

(54) WHEEL NUT ASSEMBLY

(71) Applicant: Michael Ferman, Peakhurst (AU)

(72) Inventor: Michael Ferman, Peakhurst (AU)

( * ) Notice: Subject to any disclaimer, the term of this patent is extended or adjusted under 35 U.S.C. 154(b) by 134 days.

(21) Appl. No.: 15/529,696

(22) PCT Filed: Nov. 23, 2015

(86) PCT No.: PCT/AU2015/000706
§ 371 (c)(1),
(2) Date: May 25, 2017

(87) PCT Pub. No.: WO2016/081975
PCT Pub. Date: Jun. 2, 2016

(65) Prior Publication Data
US 2017/0326909 A1 Nov. 16, 2017

(30) Foreign Application Priority Data
Nov. 26, 2014 (AU) .................................. 2014904781

(51) Int. Cl.
*F16B 5/02* (2006.01)
*B60B 3/16* (2006.01)
(Continued)

(52) U.S. Cl.
CPC .............. *B60B 3/165* (2013.01); *B60B 23/06* (2013.01); *F16B 5/0275* (2013.01);
(Continued)

(58) Field of Classification Search
CPC .. F16B 5/00; F16B 5/02; F16B 5/0275; F16B 35/00; F16B 37/00; F16B 37/14; F16B 39/00; F16B 39/028; F16B 39/16; B60B 3/165; B60B 23/06
USPC .......... 411/372.5, 372.6, 373, 374, 383, 427, 411/429, 432
See application file for complete search history.

(56) References Cited

U.S. PATENT DOCUMENTS 4,057,985 A    11/1977   Stahl
4,324,516 A *   4/1982   Sain ...................... F16B 41/005
                                                                 411/5
(Continued)

FOREIGN PATENT DOCUMENTS

WO      2011057337      5/2011

OTHER PUBLICATIONS

Corresponding International Search Report for PCT/AU2015/000706 dated Jan. 8, 2016.

*Primary Examiner* — Roberta S Delisle
(74) *Attorney, Agent, or Firm* — The Belles Group, P.C.

(57) ABSTRACT

A wheel nut assembly for fixing a wheel to a vehicle hub which includes a wheel nut with an internal thread and an axial body extension on said nut including a first section with an internal set of axial grooves or ribs and a second section containing a second internal screw thread. There is also a wheel stud having an external thread to co-operate with the internal thread of said wheel nut and having an end portion adapted to project beyond the wheel nut which end portion includes axial grooves or ribs on its external surface. An axial retaining cap consists of an upper externally screw threaded first portion which is adapted to engage the second internal screw thread of said body extension of said nut and attached to said first portion a second cap portion having internal grooves or ribs complementary to the external ribs or grooves on said wheel stud adapted to fit over said wheel stud and having external ribs or grooves adapted to engage the internal set of axial grooves or ribs on the first section of said body extension of said wheel nut. The first portion of said retaining cap is able to be rotated so that it moves axially down the internal screw thread of the second section of said body extension of said wheel nut so that the second portion of said cap is pushed down the end of said wheel stud and is held between the external ribs and grooves of the end of said wheel stud and the internal ribs and grooves of the first section of said body extension of said wheel nut.

3 Claims, 4 Drawing Sheets

(51) Int. Cl.
 *F16B 39/16* (2006.01)
 *F16B 39/02* (2006.01)
 *B60B 23/06* (2006.01)
 *F16B 5/00* (2006.01)
 *F16B 39/00* (2006.01)

(52) U.S. Cl.
 CPC ............ *F16B 39/028* (2013.01); *F16B 39/16*
  (2013.01); *F16B 5/00* (2013.01); *F16B 39/00*
  (2013.01)

(56) References Cited

U.S. PATENT DOCUMENTS

| | | | | |
|---|---|---|---|---|
| 4,521,146 | A * | 6/1985 | Wharton | F16B 41/005 411/1 |
| 4,574,602 | A * | 3/1986 | Furuse | F16B 41/005 411/427 |
| 6,053,681 | A * | 4/2000 | Mattershead | F16B 37/14 411/14 |
| 6,695,557 | B2 * | 2/2004 | Hove | F16B 37/14 292/307 B |
| 7,172,380 | B2 * | 2/2007 | Lees | F16B 37/14 411/120 |
| 8,821,093 | B2 * | 9/2014 | Kratzer | F16B 37/14 411/204 |
| 2003/0044258 | A1 * | 3/2003 | Hove | F16B 37/14 411/429 |
| 2005/0260059 | A1 | 11/2005 | Lees et al. | |
| 2013/0209194 | A1 * | 8/2013 | Kratzer | F16B 37/14 411/204 |

\* cited by examiner

WHEEL NUT ASSEMBLY

PRIORITY

Priority is claimed as a national stage application, under 35 U.S.C. § 371, to international patent application No. PCT/AU2015/000706, filed Nov. 23, 2015, which claims priority to Australian patent application No. 2014904781, filed Nov. 25, 2014. The disclosures of the aforementioned priority applications are incorporated herein by reference in their entirety.

This invention relates to wheel nuts for retaining vehicle wheels on the wheel hub and for ameliorating the risk of the nuts becoming loose.

BACKGROUND TO THE INVENTION

In order to prevent wheel nuts loosening one approach has been to provide a stud for the nut that has an internal thread of opposite hand to the thread of the nut. Such an arrangement is disclosed in U.S. Pat. No. 6,916,144.

Another proposal is to use a compression collar for the nut as in U.S. Pat. No. 6,935,825.

U.S. Pat. No. 6,053,681 discloses a custom wheel stud with a polygonal extension and an axial internal screw thread into the stud extension. A cap covered the nut and engaged the polygonal extension of the stud and a cover was fastened to the end of the stud by a screw to prevent removal of the cap. This arrangement had the disadvantage that the nut and cover are separate items and this means that while the nut is being tightened there are 3 loose components (cap cover and screw) lying around.

In these arrangements it is important to have tamper proof nut assembly that visibly indicates that the nut is tightened. In addition it is usual to provide an aesthetic cap or cover for the nut.

WO2011/057337 by the present applicant addressed some of these issues but required a number of components and a complex locking mechanism.

It is an object of this invention to provide a tamper evident wheel nut arrangement that also enables the provision of a variety of aesthetic appearances in a simple and cost effective way.

BRIEF DESCRIPTION OF THE INVENTION

To this end the present invention provides a wheel nut assembly for fixing a wheel to a vehicle hub which includes a wheel nut with an internal thread and an axial body extension on said nut including a first section with a set of internal set of axial grooves or ribs and a second section containing a second internal screw thread;

a wheel stud having an external thread to co-operate with the internal thread of said wheel nut and having an end portion adapted to project beyond the wheel nut which end portion includes axial grooves or ribs on its external surface;

an axial retaining cap consisting of an upper externally screw threaded first portion which is adapted to engage the second internal screw thread of said body extension of said nut and attached to said first portion a second cap portion having internal grooves or ribs complementary to the external ribs or grooves on said wheel stud adapted to fit over said wheel stud and having a set of external ribs or grooves adapted to engage the internal set of axial grooves or ribs on the first section of said body extension of said wheel nut;

said first portion of said retaining cap being able to be rotated so that it moves axially down the internal screw thread of the second section of said body extension of said wheel nut so that the second portion of said cap is pushed down the end of said wheel stud to engage the external ribs and grooves of the end of said wheel stud and optionally the internal ribs and grooves of the first section of said body extension of said wheel nut.

This arrangement has the advantage of fewer components and ease of operation. An allen key may be provided to enable rotation of the first portion and the allen key may be a custom design where security from theft is a key factor. The major benefit is the prevention of nut loosening with a simple to use fast method for wheel changes.

The first and second portions of the cap are connected but may rotate relative to each other about the axis of the stud. The ribs and grooves on the internal and external surface of the second part are arranged align with both the complementary ribs or grooves on end of the wheel stud and the internal surface of the nut extension.

DETAILED DESCRIPTION OF THE INVENTION

Various embodiments of the invention will be described with reference to the drawings in which FIG. 1 illustrates the assembled wheel stud and nut according to an embodiment of this invention;

Figures 1, 2:
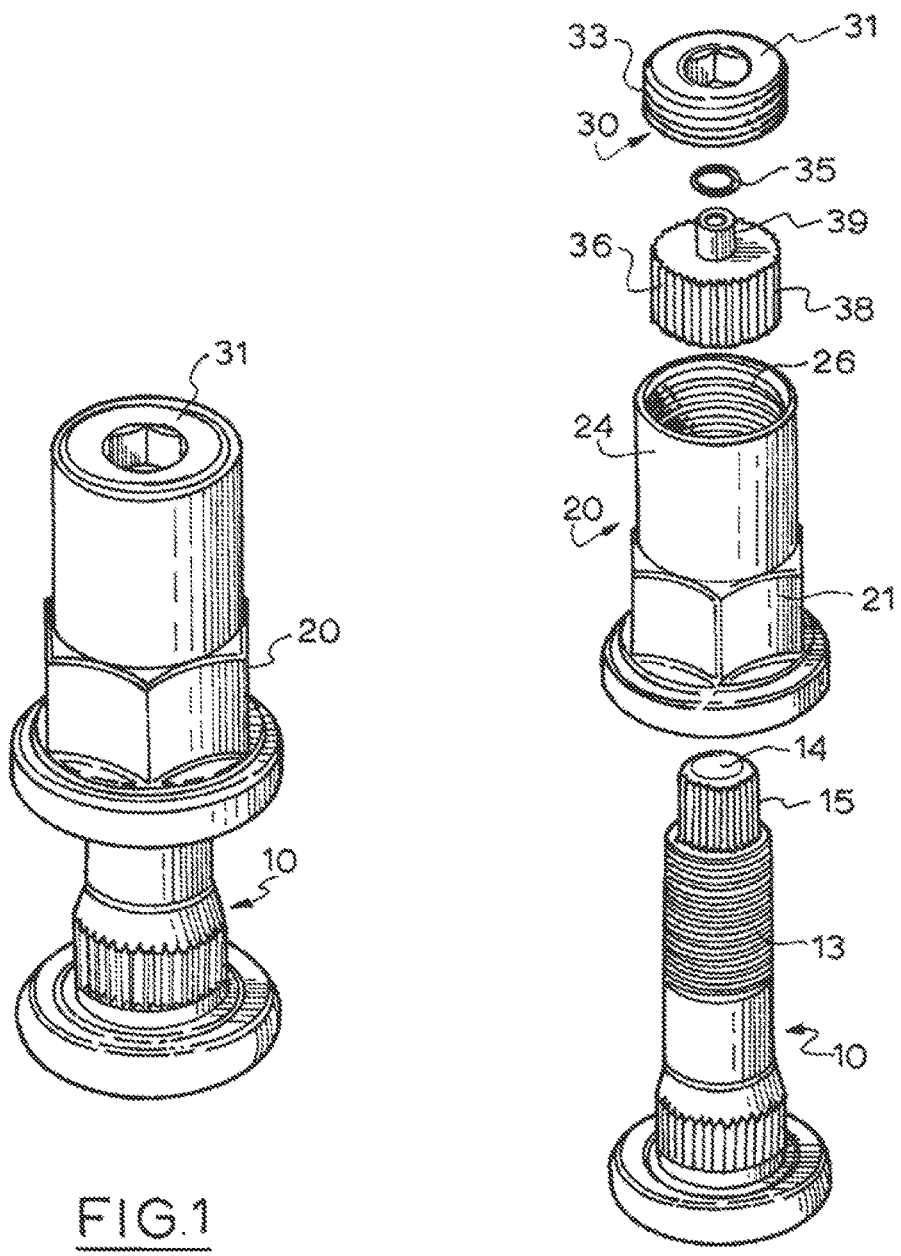
FIG. 2 is an exploded view of the embodiment of FIG. 1.
Figure 3:
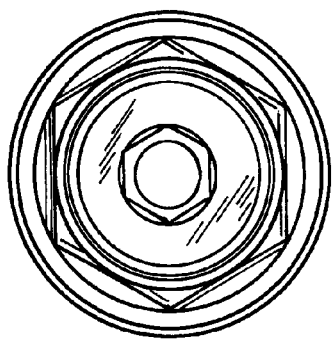
FIG. 3 is a top view of the embodiment of FIG. 1.
Figure 4:
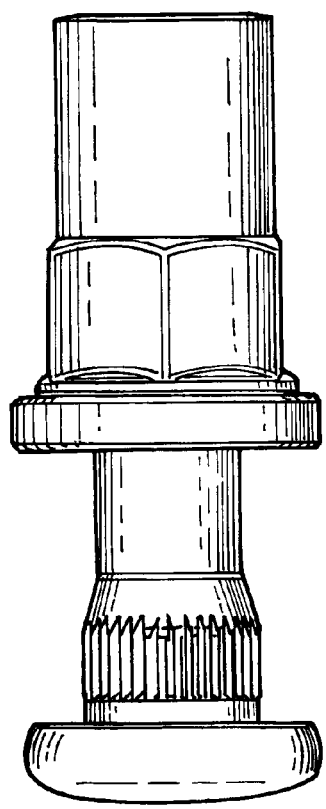
FIG. 4 is a side view of the embodiment of FIG. 1.
Figure 5:
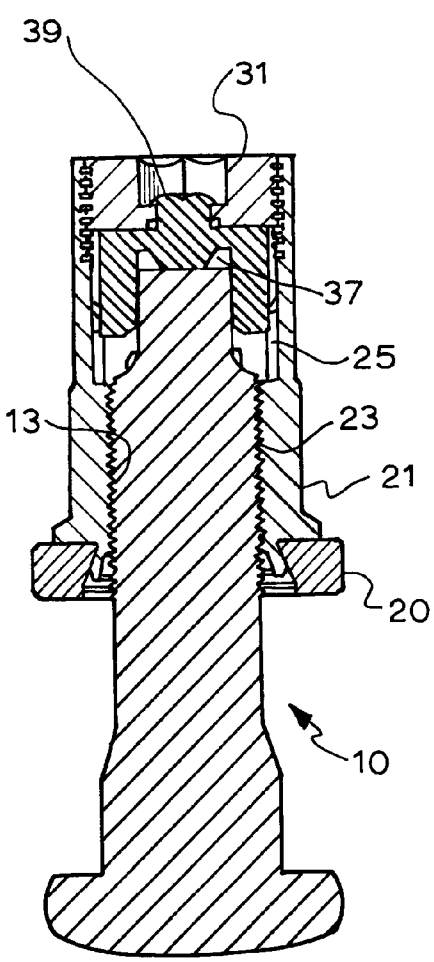
FIG. 5 is a section view of the embodiment of FIG. 1.
Figure 8:
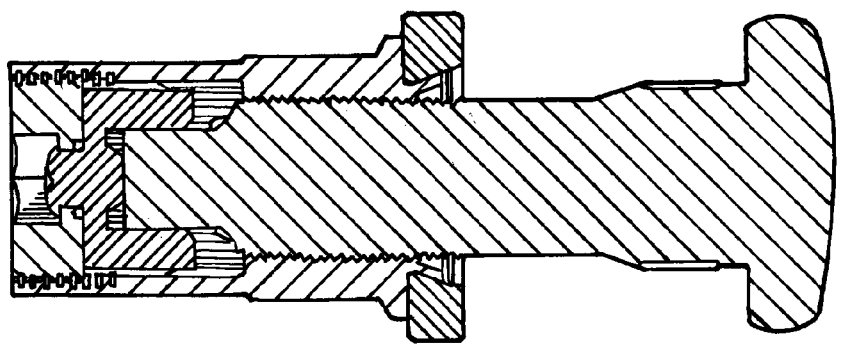
FIG. 8 is a section view of the embodiment of FIG. 1 with the cap and nut fully engaged.
Figure 7:
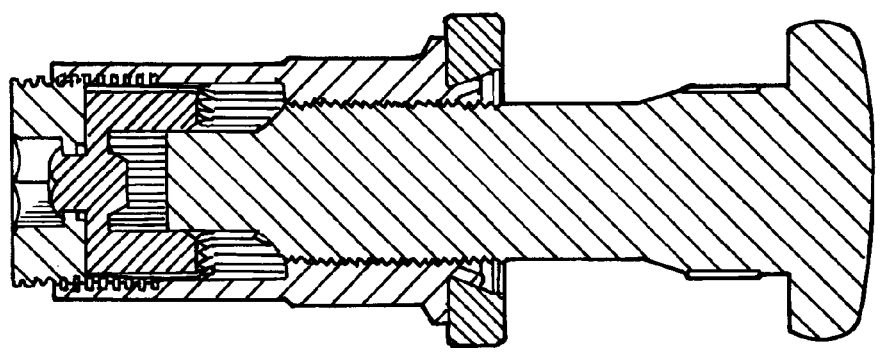
FIG. 7 is a section view of the embodiment of FIG. 1 with the cap beginning to be screwed down.

The custom wheel stud 10 is a conventional stud having the external screw thread 13 except for the extension 14 and splines 15.

The custom wheel nut 20 has the conventional nut body 21 with the conventional screw thread 23 engaging the screw thread 13 of the stud. The cylindrical extension 24 has a first section with internal splines or ribs 25 and a second section with a second internal screw thread 26 which can best be seen in the sectional views.

The locking cap 30 consist of two parts the key 36 and the allen key cap 31.

The key cap 31 has internal splines or grooves 37 that engage with the splines 15 of the stud. The key 36 has external splines 38 that engage with the internal splines 25 of the nut extension. The key 36 as shown is a cylinder but it may be a partial cylinder or a set of pins or a corrugated cylinder. As a corrugated cylinder key 36 may also be discontinuous and act as a spring. The rivet 39 is deformed to allow the key to be attached to the allen key cap 31 and allow the cap and key to be moved relative to each other. The O ring 35 seats between the cap 31 and the key 36. The allen key cap has external screw thread 33 which engages the internal screw thread 26 of the nut extension.

Figure 6:
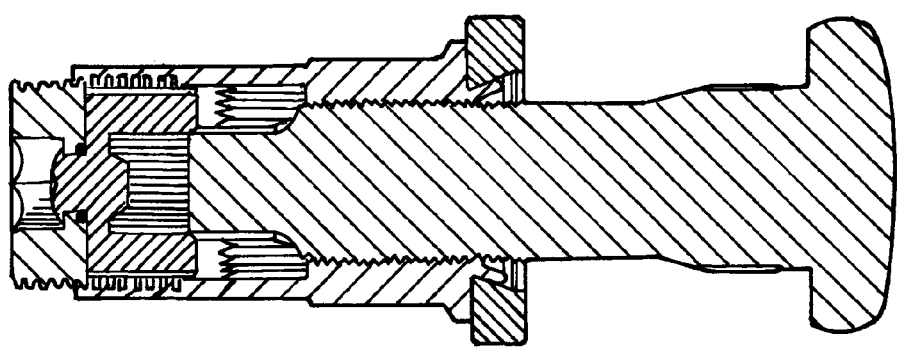
FIG. 6 is a section view of the embodiment of FIG. 1 with the nut tightened but the cap disengaged.
Figure 10:
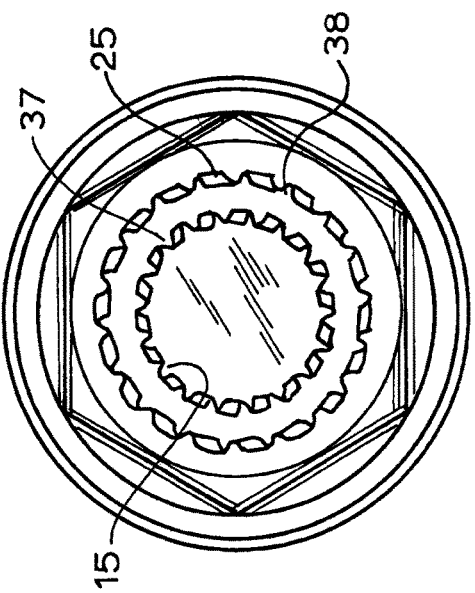
FIG. 10 illustrates another alignment arrangement of the splines on the nut, key and stud.
Figure 9:
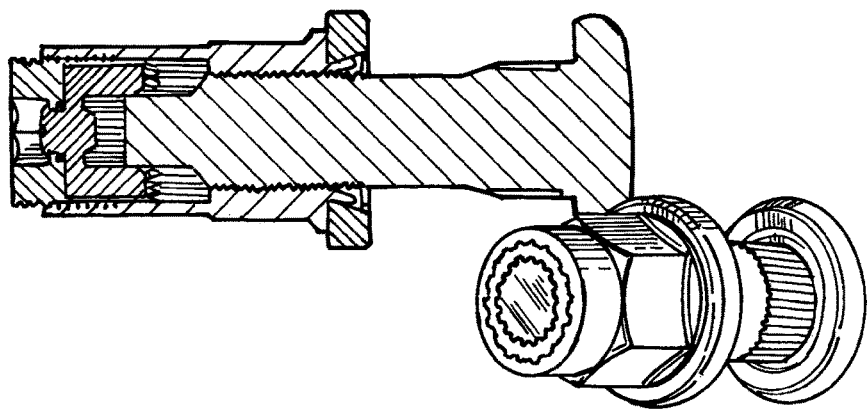
FIG. 9 illustrates the alignment of the splines on the nut, key and stud.
Figure 9:
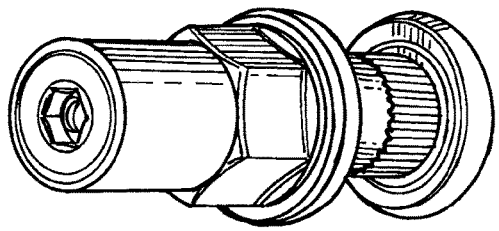

The nut and cap assembly is sold assembled as shown in FIG. 6. This means the nut can be tightened to the stud in the normal way as shown in FIG. 6.

To lock the nut the allen key cap 31 is rotated so that the cap 31 and key 36 move axially toward the nut and the internal splines 37 of the key engage the external splines 15 of the stud. This movement also means that the external splines 38 of the key engage the internal splines 25 of the nut extension. The splines on the internal and external surface of the key 36 are arranged so that a small amount of paly is sufficient for the splines to engage with the complementary grooves 15 and 25 of the stud and nut. When the cap 30 is fully tightened the nut cannot be rotated. And the cap can only be unscrewed using an allen key.

Other conventional means for rotating cap 31 besides an allen key.

Those skilled in the art will realise that this invention provides a unique and less expensive means of ensuring that a wheel nut is securely fastened to the wheel hub. Those skilled in the art will also realise that this invention may be implemented in embodiments other than those described without departing from the core teachings of the invention.

The invention claimed is:

1. A wheel nut assembly for fixing a wheel to a vehicle hub which includes
    a wheel nut with an internal thread and an axial body extension on said nut including a section containing a second internal screw thread;
    a wheel stud having an external thread to co-operate with the internal thread of said wheel nut and having an end portion adapted to project beyond the wheel nut which end portion includes axial grooves or ribs on its external surface;
    an axial retaining cap consisting of an upper externally screw threaded first portion which is adapted to engage the second internal screw thread of said body extension of said nut and a second cap portion attached to said first portion said second cap portion having internal grooves or ribs complementary to the external ribs or grooves on said wheel stud adapted to fit over said wheel stud;
    said first portion of said retaining cap being able to be rotated so that it moves axially down the internal screw thread of the second section of said body extension of said wheel nut so that the second portion of said cap is pushed down the end of said wheel stud and to engage the external ribs and grooves of the end of said wheel stud.

2. A wheel nut assembly as claimed in claim 1 wherein said wheel nut extension includes a first section with a set internal set of axial grooves or ribs between the first and second screw threads of said nut and the second portion of said retaining cap having a set of external ribs or grooves adapted to engage the internal set of axial grooves or ribs on the first section of said body extension of said wheel nut, when the cap portion is screwed into the wheel nut extension.

3. A wheel nut for use in the assembly of claim 1 which consists of
    a wheel nut with an internal thread and an axial body extension on said nut including a section containing a second internal screw thread;
    an axial retaining cap consisting of an upper externally screw threaded first portion which is adapted to engage the second internal screw thread of said body extension of said nut and attached to said first portion a second cap portion having internal grooves or ribs complementary to the external ribs or grooves on said wheel stud adapted to fit over said wheel stud and having a set of external ribs or grooves adapted to engage the internal set of axial grooves or ribs on the first section of said body extension of said wheel nut;
    said first portion of said retaining cap being able to be rotated so that it moves axially down the internal screw thread of the second section of said body extension of said wheel nut so that the second portion of said cap is pushed down the end of said wheel stud to engage the external ribs and grooves of the end of said wheel stud and optionally the internal ribs and grooves of the first section of said body extension of said wheel nut.

\* \* \* \* \*